Aug. 19, 1958     R. E. AMLEE     2,848,598
FLASHLIGHT WITH BATTERY LOCKING DEVICE
Filed May 18, 1955
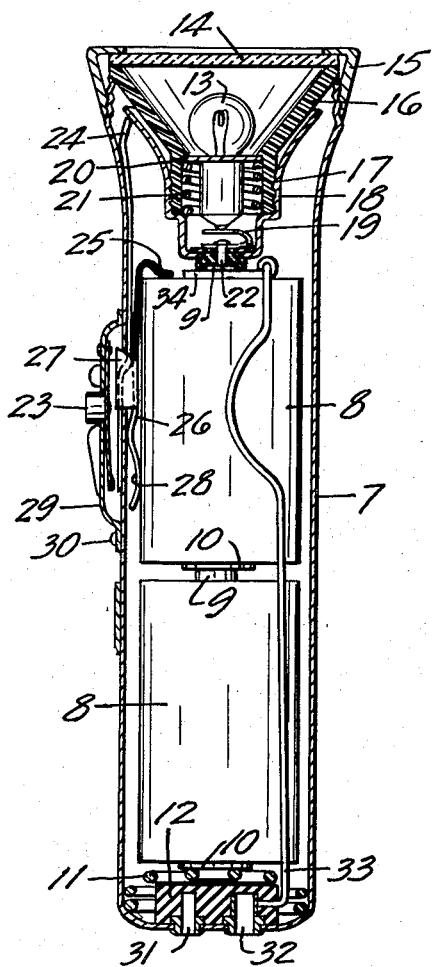
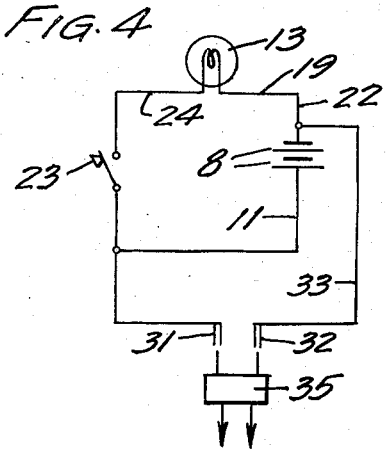
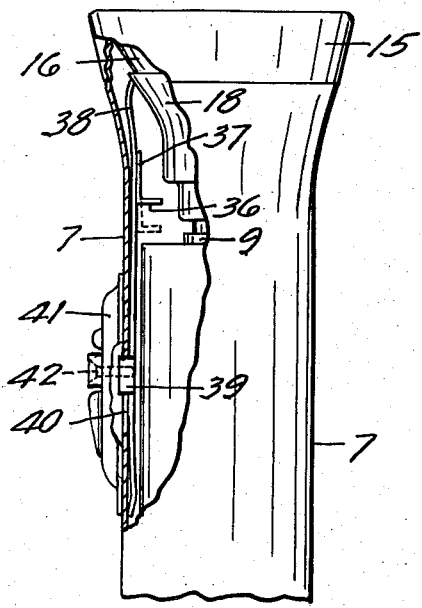
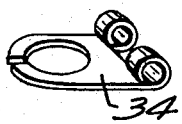
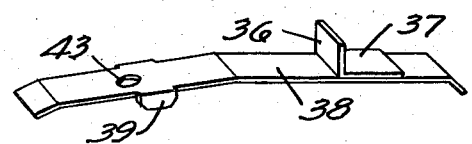
INVENTOR.
RICHARD E. AMLEE
BY
ATTORNEY

United States Patent Office 2,848,598
Patented Aug. 19, 1958

2,848,598

FLASHLIGHT WITH BATTERY LOCKING DEVICE

Richard E. Amlee, St. Paul, Minn., assignor to Gould-National Batteries, Inc., St. Paul, Minn., a corporation of Delaware Application May 18, 1955, Serial No. 509,155

3 Claims. (Cl. 240—10.66)

This invention relates to portable electric lamps and particularly to flashlights which are supplied with power from self-contained storage batteries adapted to be recharged without removing the batteries from the lamp housing.

It is an object of my invention to provide in a portable lamp of the class described means for guarding against damage to or destruction of the batteries resulting from mishandling and particularly from changes in the normal positions of the batteries determining their essential polarity in the charging and discharging circuits.

My invention also includes certain other novel features of construction which will be more fully pointed out in the following specification and claims.

It has been found that such mishandling is likely to occur if the flashlights are so constructed that the ordinary owner or user may readily remove the batteries from the casing. Many users are accustomed to removing the batteries of flashlights powered with dry cells because of the need for replacing such batteries from time to time when the old cells become weak or dead. With my improved flashlight it is necessary to allow access to the electric lamp or bulb because it must be replaced from time to time but there is no need for removing the rechargeable batteries from the casing. On the contrary, to permit their removal by the ordinary user may lead to reversal of their polarity in the circuit when they are returned to the casing. Such reversal of polarity may be destructive with storage batteries of the sealed type, such as those which have been devised and made available in recent years. Gas pressures within the sealed casing may be built up to a point where the casing is ruptured as a result of incorrect directional charging or discharging.

The present invention affords inexpensive means for effectively guarding against the removal of the batteries from the casing, except by the use of a special tool and by one having special knowledge not possessed by the ordinary owner or user.

Referring to the accompanying drawing which illustrates, by way of example and not for the purpose of limitation, a preferred and an alternate form of my improved flashlight:

Figure 1 is a part longitudinal sectional view and part side elevational view showing a preferred form of the locking device;

Fig. 2 is a perspective view showing the preferred locking device separate from the flashlight;

Fig. 3 is a perspective view showing a charging circuit terminal connector;

Fig. 4 is a wiring diagram showing the battery charging and discharging circuits;

Fig. 5 is a part elevational and part longitudinal sectional view showing an alternate form of the locking device, and Fig. 6 is a perspective view showing the alternate form of locking device and its supporting switch member separate from the flashlight.

As shown in Fig. 1, the flashlight has a casing constructed from metal or other conducting material indicated generally by the numeral 7 containing a plurality of rechargeable storage battery cells 8 each having a positive terminal 9 and a negative terminal 10. The cells are connected together electrically, in series, with the negative terminal of the upper cell in contact with the positive terminal of the lower cell. The negative terminal of the lower cell 8 (Fig. 1) is connected to the casing 7 by means of a coiled spring 11. This end of the casing 7 is permanently closed by an integral end portion of the casing and contains a charging receptacle indicated generally by the numeral 12.

The opposite end of the casing 7, viz.: the upper end as shown in the drawing, has an opening which allows access to an electric bulb 13. Readily removable closure members for this end of the casing comprise a lens 14 confined in a ring 15 having a screw threaded connection with the open end of the casing. A suitable reflector is provided on the inner surface of a socket member 16 constructed from dielectric material. This member is formed with a threaded portion 17 having a threaded connection with a metal socket member 18. The base of the member 18 carries a spring contact 19 for one terminal of the bulb 13. The other terminal of the bulb comprises a collar 20 fixed on the base portion of the bulb and electrically connected by a coiled spring 21 to the socket member 18. The spring contact 19 is electrically insulated from the socket member 18 and has a rivet 22 extending through the insulating material and disposed to make electrical contact with the positive terminal 9 of the upper battery cell 8.

A switch of common type, indicated generally by the numeral 23, is provided on the exterior of the casing 7 for controlling the lamp circuit. As shown in Fig. 1, the switch is electrically connected by a conductor 24 to the socket member 18, this conductor being enclosed in an insulating cover where it comes in contact with the casing 7. The discharge circuit is completed by grounding the moving part of the switch 23 on the casing 7.

To lock the battery cells 8 within the casing 7, I provide the preferred form of clip shown in detail in Fig. 2. This clip has a hook-shaped end portion 25 adapted to project above the cells in the casing 7, a bow shaped shank portion 26 formed with a pair of laterally projecting lugs 27 and an end portion 28 adapted to resiliently engage the side of the adjacent cell 8. The lugs 27 engage the casing 7 in an opening formed therein and are resiliently retained in the opening by the cell 8 engaging the end portion 28. The end portion 25 and adjacent shank portion of the locking device are covered with a coating of electrical insulating material to guard against the possibility of shorting out the cell in contact with the locking device.

A switch housing 29 covers the opening for the lugs 27 and is permanently secured to the casing in the usual manner, as by rivets 30. My locking device projects far enough inward from the casing wall and is strong enough to guard against removal of the battery cells by persons other than those having knowledge of the internal construction and equipment essential for the operation of detaching the locking device from the casing. Only by the use of a suitable tool inserted between the shank portion 26 and the casing is it possible to disengage the lugs 27 from the opening in the casing. After the removal of the closure and bulb assembly including the socket member 18, one equipped with such a tool and knowing how to use it is able to remove the locking device from the casing through the open end thereof.

A simple charging circuit, incidental to the present invention, may comprise sockets 31 and 32 for the prongs of charging circuit terminal members. These sockets are designed to insure the correct polarity of the batteries during charging. The internal circuit may include an insulated conductor 33 connected at one end to the socket 32 and at the other end to a connector 34 embracing the terminal 9 of the upper cell 8. The other socket 31 is electrically grounded on the casing 7 to complete the charging circuit as shown diagrammatically in Fig. 4. Direct current for recharging the batteries may be supplied from any suitable source, such as a rectifier 35 adapted to be supplied with current from a suitable power outlet.

As shown in Figs. 5 and 6, an alternate form of my locking device may comprise a rigid clip member 36 having an integral flange portion 37 which is spot welded or otherwise secured to a movable switch member 38 of common type. The switch member 38 is constructed from spring material, such as spring brass, and is formed with a pair of lugs 39 slidably fitting in an elongated opening 40 formed in the casing 7 of the flashlight. A manually operable switch member 41 is slidably mounted on the exterior of the casing and is connected to the switch member 38 by a screw 42 (Fig. 5) engaging the member 38 in a tapped hole 43 formed thereon. The switch member 38 is thus movable longitudinally within the casing to make and break contact at its upper end with the socket member 18. This alternate form of the locking device is also designed to make it difficult for the ordinary owner or user to remove the locking device for the purpose of removing the battery cells from the casing.

It will thus be evident that with either form of locking device in place in the casing the ordinary user or owner of the flashlight cannot remove the batteries from the casing without special instruction and the use of a special tool for removing the locking device. I thereby guard against the removal of the batteries from the casing and subsequent replacement with the terminal contact members of either of them in the incorrect position with respect to the charging and discharging circuits. This is of critical importance where the rechargeable batteries are of the sealed type in which dangerously high gas pressure develops when the cells are either discharged or charged with their terminal polarity in reverse with respect to the correct polarity in the circuits.

I claim:

1. In a flashlight having an electric lamp, a rechargeable battery, a charging circuit and a discharge circuit including said battery and lamp, a casing containing said lamp, battery and circuits, said casing having a permanently closed end, an open end, a side opening and a removable closure for said open end, an improved battery locking device comprising, a clip having a rigid member projecting laterally between the battery and open end of the casing for confining the battery in said casing, said clip having a shank portion extending between the casing and a side of the battery, a lug projecting from said shank portion and normally engaging said casing in said side opening to retain said rigid member in confining relation to the battery in said casing and a switch housing covering said opening in said casing.

2. A battery locking device in accordance with claim 1 wherein said clip and rigid member are insulated electrically from the battery terminals.

3. A battery locking device in accordance with claim 1 wherein said clip is included as a conductor in said discharge circuit and has a switch contact member integral therewith, being selectively movable to open or close said discharge circuit, and switch actuating means connected to said clip.

References Cited in the file of this patent

UNITED STATES PATENTS 1,999,079     Blake                  Apr. 23, 1935

FOREIGN PATENTS 296,277     Great Britain           Aug. 30, 1928